INVENTORS.
CLAUDE C. HALL,
ROBERT W. HOMPE
& JACK A. MARTELL
BY
ATTORNEYS.

INVENTORS.
CLAUDE C. HALL,
ROBERT W. HOMPE
& JACK A. MARTELL
BY
ATTORNEYS.

Aug. 26, 1952 — C. C. HALL ET AL — 2,608,316
LABELING MACHINE
Filed Nov. 22, 1950 — 8 Sheets-Sheet 5

*INVENTORS.*
CLAUDE C. HALL,
ROBERT W. HOMPE
& JACK A. MARTELL
BY
ATTORNEYS.

Aug. 26, 1952 C. C. HALL ET AL 2,608,316
LABELING MACHINE
Filed Nov. 22, 1950 8 Sheets-Sheet 7

INVENTORS.
CLAUDE C. HALL,
ROBERT W. HOMPE
& JACK A. MARTELL
BY Busser & Harding
ATTORNEYS.

Aug. 26, 1952 C. C. HALL ET AL 2,608,316
LABELING MACHINE
Filed Nov. 22, 1950 8 Sheets-Sheet 8

INVENTORS.
CLAUDE C. HALL,
ROBERT W. HOMPE
& JACK A. MARTELL
BY
ATTORNEYS

Patented Aug. 26, 1952

2,608,316

UNITED STATES PATENT OFFICE 2,608,316

LABELING MACHINE

Claude C. Hall, Philadelphia, and Robert W. Hompe, Ithan, Pa., and Jack A. Martell, Westville, N. J., assignors to Smith, Kline & French Laboratories, Philadelphia, Pa., a corporation of Pennsylvania Application November 22, 1950, Serial No. 197,092

15 Claims. (Cl. 216—2)

This invention relates to labeling machines and more particularly relates to machines adapted to glue a label on a bottle, box or the like. Further, the labeling machines in accordance with this invention are adapted to print on each label.

Broadly speaking, this invention can be said to be an improvement on the labeling machine disclosed in Patent 2,227,816, issued to G. W. von Hofe on January 7, 1941. Many of the mechanisms utilized in the labeling machine in accordance with this invention are fully disclosed in Patent 2,227,816. It is desired to point out that the particular novelty of this invention is that in addition to securing labels on containers or the like, it is adapted to print, for example, a code number on each label.

Heretofore the practice has been to either print the code number on the labels during the label-printing process or to print or stamp the code number on the label after the label was received from the printer. This latter process obviously is wasteful from the point of view of the time consumed. Both processes are unsatisfactory due to the inherent difficulties in estimating the number of labels required for any particular batch. In order that the production line not be held up, it has grown to be common practice to over-supply each code number group of labels which results in a consequent waste of labels. The printing of the code number on the label by the labeling machine just before application of the label to the container is obviously the most economical and expeditious method and has the further advantage that it eliminates complicated cross-referencing systems incident to using a code number different from the batch number of the material being used. Similarly, it is often desired to print other matter on the labels during the labeling process.

It is, therefore, an object of this invention to provide a labeling machine which is adapted to print on a label and secure the label to a container.

It is a further object of this invention to provide a labeling machine which is adapted to print on a label and secure the label to a container and operate effectively at a high rate of speed.

These and other objects of this invention will be apparent on reading the accompanying description in conjunction with the drawings in which.

Figure 1:
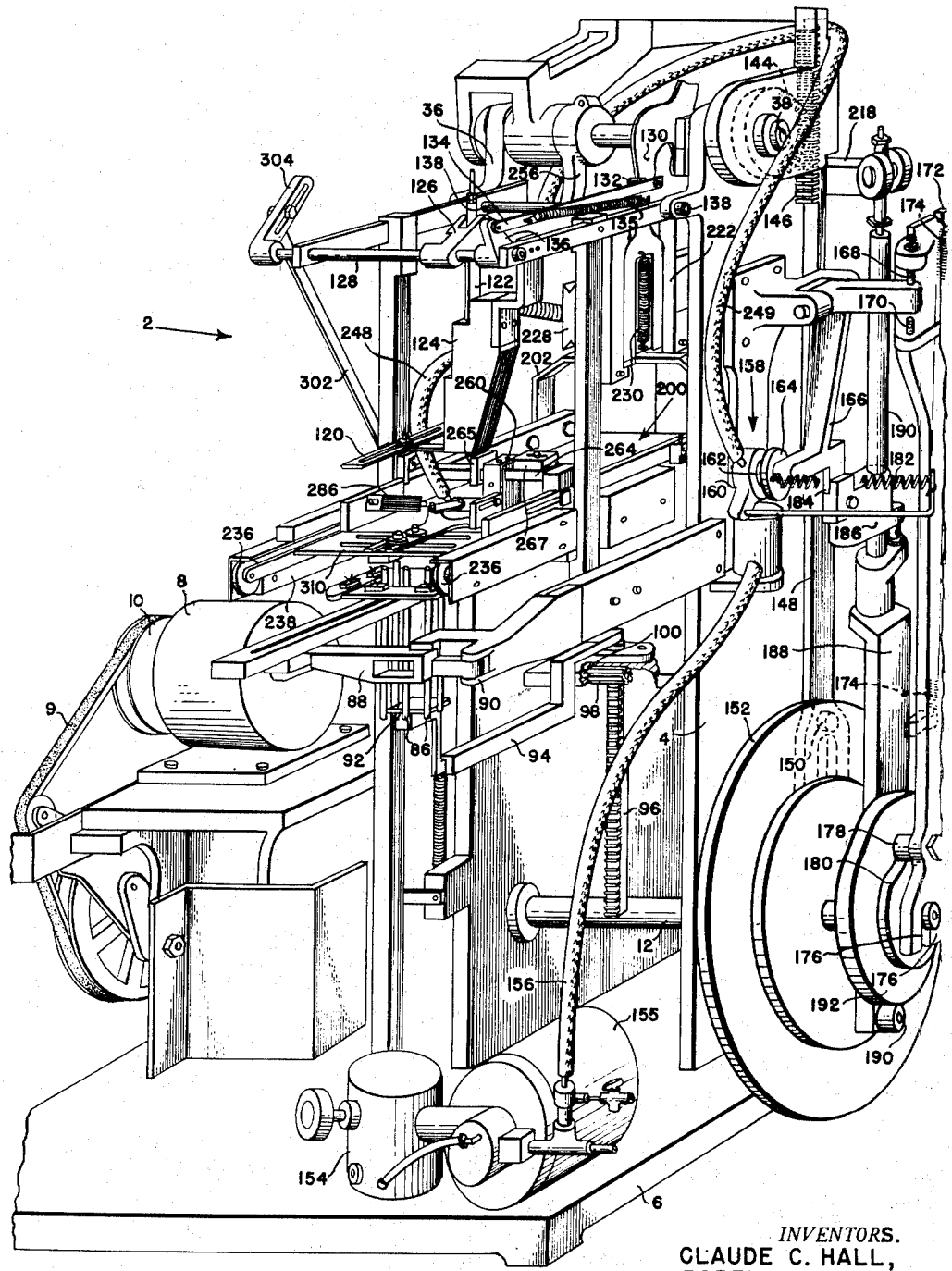
Figure 1 is a rear perspective view of a machine in accordance with this invention.
Figure 2:
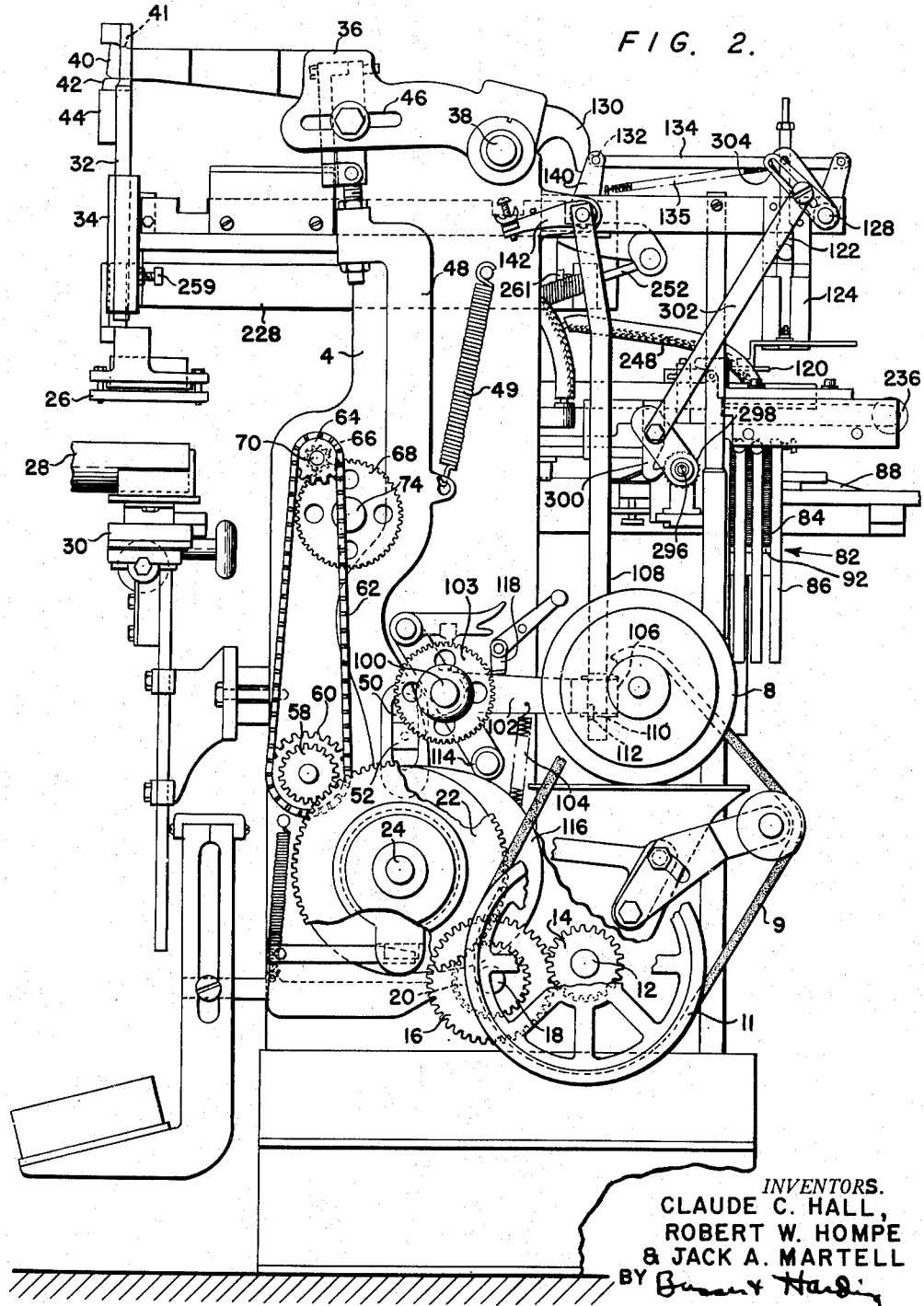
Figure 2 is a side elevation of the machine of Figure 1 looking at the right-hand side of the machine.

As shown in the drawings, particularly in Figures 1 and 2, a labeling machine 2 in accordance with this invention has a frame 4 mounted on a base 6. A motor 8 supported on base 6 drives belt 9 through a pulley 10, which in turn drives pulley 11 which is fixedly secured to shaft 12.

Shaft 12 has a gear 14 secured thereto. Gear 14 drives gear 16 fixedly secured to shaft 18 to which is secured a gear 20. Gear 20 meshes with and drives a gear 22 which in turn drives shaft 24.

In order to exert pressure upon the labels after they have been deposited on the articles to be labeled, there is provided a pressure member 26 which is shown vertically disposed above a bottle 28 carried by a support 30. Pressure member 26 is carried by a plunger 32 which operates vertically in slide 34.

An arm 36 which is loosely pivoted to a shaft 38 operates plunger 32. Arm 36 has an end 40 which engages a slot 41 in plunger 32 and engages a plunger 42 which is biased upwardly by a spring in casing 44.

Arm 36 has a slot 46 through which a lever 48 is connected. A spring 49 biases lever 48 upwardly. Lever 48 at its lower end is provided with a recess 50 which accommodates a block 52 pivotally mounted on frame 4. A cam which is secured to shaft 24 provides for the operation of lever 48 and hence pressure member 26 in timed relation with the remaining elements of the labeling machine.

Gear 22 drives a gear 58 which in turn drives a sprocket 60. Sprocket 60 carries a chain 62 which drives sprocket 64 which in turn drives gears 66 and 68. Sprocket 64 is secured to a shaft 70 to which is also secured a roller 72, and gear 68 is secured to a shaft 74 to which is secured a roller 76 (see Figure 3).

Rollers 72 and 76 provide adhesive for the labels. The lower portion of roller 76 rotates in a basin 78 which contains adhesive material. Roller 72 has grooves 80 into which blades 79 and 81 project. Any conventional adhesive applying means would be satisfactory here.

A magazine 82 provides a supply of labels 84. Magazine 82 has a plurality of vertical tubular members 86, the rearmost line of which are secured to a bracket 88 which is pivoted at 90 to provide free access to the interior of the magazine.

Labels 84 are supported on a platform 92 which is connected to an arm 94. Arm 94 is fixedly secured to a rack 96 which is engaged by a gear 98 secured to shaft 100. Shaft 100 is rotated to elevate platform 92 by a pawl 102 working with a ratchet wheel 103 secured to shaft 100. Pawl 102 is biased downwardly by a coil spring 104. Pawl 102 has a forked end 106 which straddles an upstanding lever 108. Pawl 102 has a portion 110 which engages a shoulder 112 of lever 108.

When portion 110 of pawl 102 is disengaged from shoulder 112, pawl 102 is pulled downwardly by spring 104, thus rotating shaft 100 clockwise as viewed in Figure 2. This results in the elevation of rack 96 and consequent elevation of the platform 92. A roller 114 acts in conjunction with a cam 116 secured to shaft 24 to return the pawl to the upper position where it can reengage shoulder 112 of lever 108. A stop pawl 118 is also provided.

The height of labels 84 in magazine 82 determines whether or not lever 108 releases pawl 102 for the elevation of platform 92. As shown in Figures 1 and 2, a label feeler 120 is secured to a lever 122 which is adapted to slide vertically in block 124. Lever 122 is pivotally secured to fork member 126 which in turn is fixedly secured to shaft 128. Shaft 128 is rocked by means of cam 130 which is secured to shaft 38 which is oscillated in a manner hereinafter to be described. Cam 130 engages a roller 132 on lever 134 which is biased rearwardly by spring 135. The end of lever 134 is connected to lever 136 which is in turn connected to shaft 128. Lever 134 is also connected to a cross-shaft 138 by a link 140. As shown particularly in Figure 2, shaft 138 has a finger 142 which is adapted to engage lever 108.

Cam 130 periodically permits spring 135 to act to lower feeler 120 until it reaches the top of the labels 84 in magazine 82. If the top label is lower than is desirable, then feeler 120 moves downwardly sufficiently far to cause shaft 138 to be rotated sufficiently to cause finger 142 to engage lever 108 and move that lever to disengage it from pawl 102, thus, providing for the raising of the labels.

Shaft 38 is oscillated by a gear segment 144 which meshes with rack 146. Rack 146 is secured to a member 148 which is forked at its lower end to straddle shaft 12 and carries a roller 150 which engages cam 152. Cam 152 acts to reciprocate rack 146 in timed relation with the remainder of the labeling machine.

Referring still to Figure 1, a vacuum pump 154 operated by its individual motor 155 is connected to a suction line 156. The suction in line 156 is controlled by means of a valve 158. Valve 158 has a casing 160 to which line 156 is connected. The casing has a side opening 162 adjacent to which is a closure member 164.

Closure member 164 is secured to an arm of bell crank member 166. The other arm of bell crank member 166 extends between screws 168 and 170, secured to member 172. Member 172 is biased downwardly by means of a coil spring 174 and has a fork portion 176 which embraces shaft 12. Member 172 carries a roller 178 which engages cam 180 secured to shaft 12. Member 172 in association with spring 174, cam 180 and bell crank 166 act to open valve 158 when it is desired to eliminate the vacuum suction in line 156, for example, to release a label as will be made apparent later.

Valve 158 is biased in the open position by means of a spring 182.

Bell crank 166 is moved by the closing of valve 158 and acts to release projection 184 from member 186 into a position so that member 190 can move upwardly. The lower portion 188 of member 190 is slotted at its lower end to embrace shaft 12 and has a roller 190 which engages a cam 192 secured to shaft 12. Roller 190 is biased upwardly against cam 192 by spring 174.

The mechanisms of the labeling machine 2, which have been described thus far, are all old and no claim is made to any invention with respect to these elements per se. A minimum description of these elements has been given, since, except as noted, they are as found in the disclosure of Patent 2,227,816, issued to G. W. von Hofe on January 7, 1941.

Figure 6:
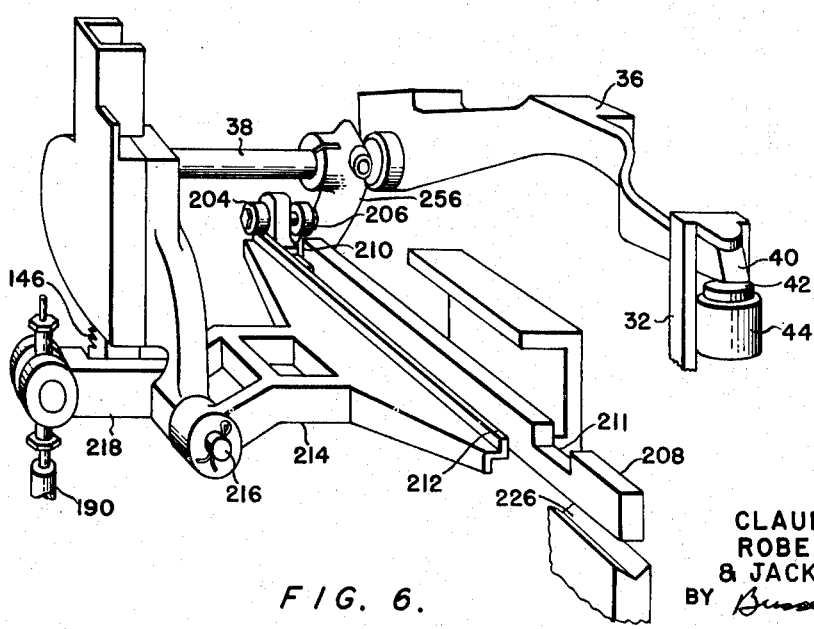
Figure 6 is a fragmentary perspective view showing the movable rail.
Figure 8:
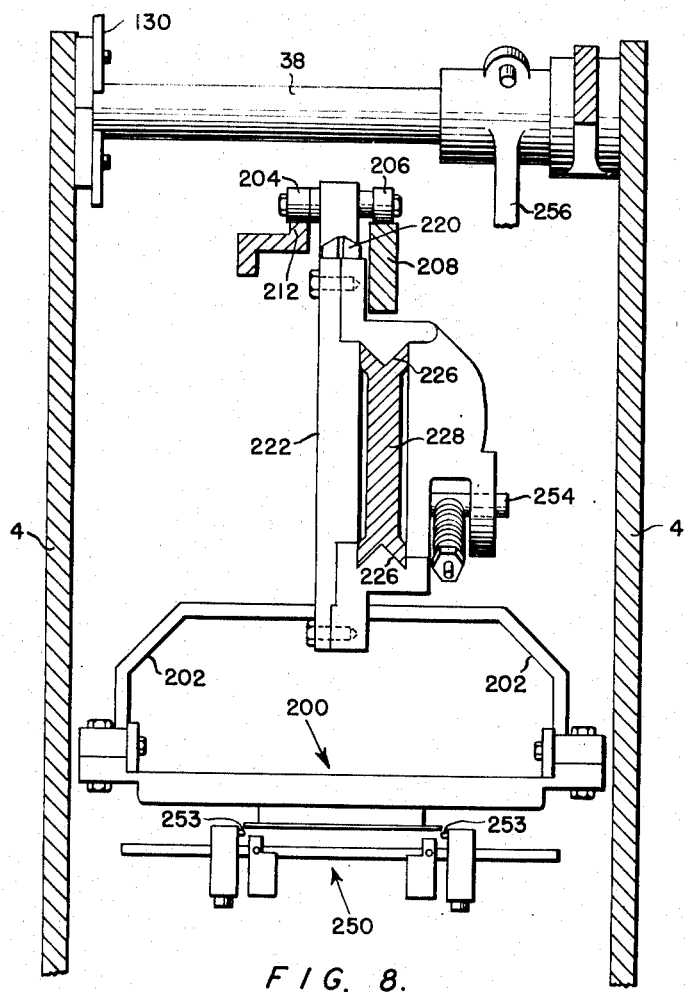
Figure 8 is a vertical section taken on the plane indicated by the line 8—8 in Figure 3.

The novel features of this invention as they act in combination with the elements already considered will now be described. A carriage 200 is supported by a yoke 202 which has at its upper end a pair of rollers 204 and 206. Roller 206 is adapted to ride on a rail 208 which has a pair of cut-out portions 210 and 211. Roller 204 is adapted to travel on a movable rail 212. Movable rail 212 is secured to a bracket 214 which is pivoted at 216. Bracket 214 has an arm 218 which is pivotally connected to member 190. As we have seen previously, member 190 is adapted to be reciprocated by the inter-action of member 190, spring 174 and cam 192 when projection 184 and member 186 are properly aligned. This provides for the lowering and raising of rail 212. (See Figures 6 and 8.)

The upper portion 220 of yoke 202 is adapted to slide vertically with relation to member 222 which is slidably secured in grooves 226 in member 228. A coil spring 230 is secured at its upper end above opening 232 in yoke member 202 and is secured at its lower end to member 222 at 234. (See Figure 3.)

Carriage 200 is additionally supported by a pair of rollers 236 which are adapted to travel on track 238. It will be noted that track 238 is dropped abruptly at 240 and from this point forward provides no support for rollers 236. It will be noted that the rearmost extension of track 238 extends to the point indicated at 242 leaving the rollers unsupported to the rear of this point.

A rear suction head 244 and a front suction head 246 are secured to carriage 200. Head 244 is connected by line 248 to line 249 which is connected to valve 158. When carriage 200 is in its rearward position, head 244 is positioned over label magazine 82 and when the carriage is in its forward position it is positioned over a printing table 250. Head 246 is connected to line 249 and when carriage 200 is in the rearward position is positioned over printing table 250 and when it is in its forward position head 246 is positioned over bottle 28 which is to receive the label.

Figure 5A:
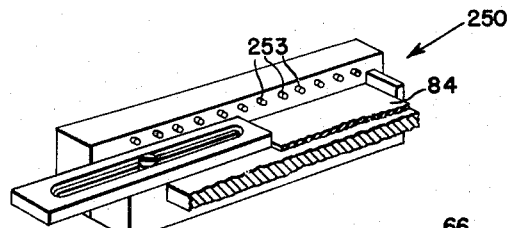
Figure 5a is a fragmentary perspective view of the printing table.
Figure 5:
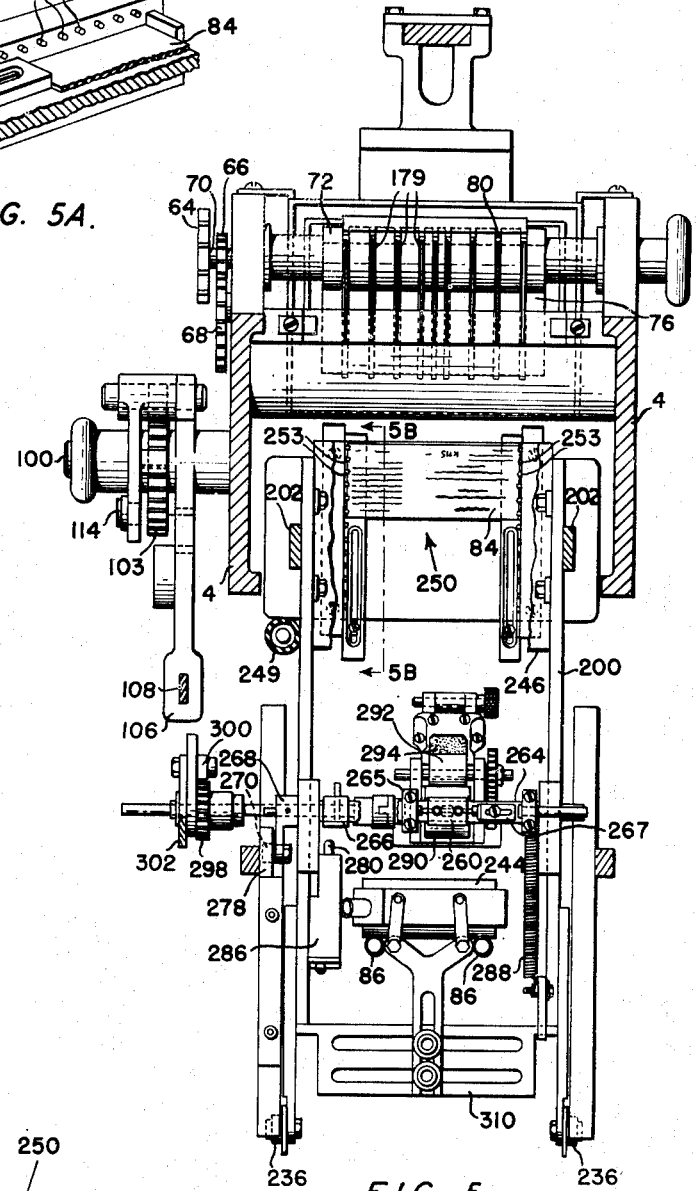
Figure 5 is a horizontal section taken on the plane indicated by the line 5—5 in Figure 3.
Figure 5B:
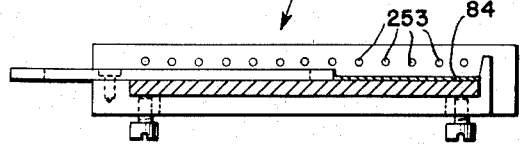
Figure 5b is a vertical section of the printing table.

Printing table 250 is provided with horizontal hold down pins 253 on either side thereof (see Figures 5, 5a and 5b).

Carriage 200 is reciprocated from the rearward to the forward position by a rod 252 which is pivotally connected to member 222 at 254 by a floating spring pivot and pivotally connected to arm 256 at 258. Arm 256 is fixedly secured to shaft 38 which, as has been described previously, is rocked by gear segment 144. As shown in Figure 2, the travel of member 222 is limited by a forward stop 259 and a rear stop 261.

Figure 9:
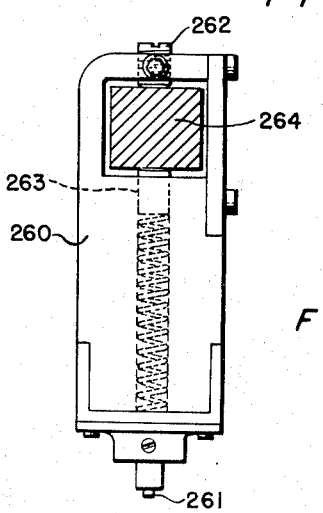
Figure 9 is a side elevation of the printing arm.

The mechanisms which in combination with the previously described mechanisms is adapted to print on each label will now be described. A printing arm 260 carrying a code number shown at 261 on its lower face is secured to a square portion of transverse shaft 264 which is pivotally secured to carriage 200 (see Figures 5 and 9). The printing arm is floated on shaft 264 between a set screw 262 and a spring backed plunger 263 which permits the printing arm to move upwardly relative to the shaft. Stop members 265 and 267 on shaft 264 prevent the lateral movement of printing arm 260.

An actuating arm 266 is fixedly secured to shaft 264 and has secured to its lower end a pin 272. Pin 272 projects horizontally and coacts with a cam track 274 having a shoulder 276 in a manner to be more fully described later. A stop arm 268 carrying a roller 270 is fixedly secured to shaft 264. Stop arm 268 coacts with a stop member 278 (see Figures 3 and 4).

Figure 10:
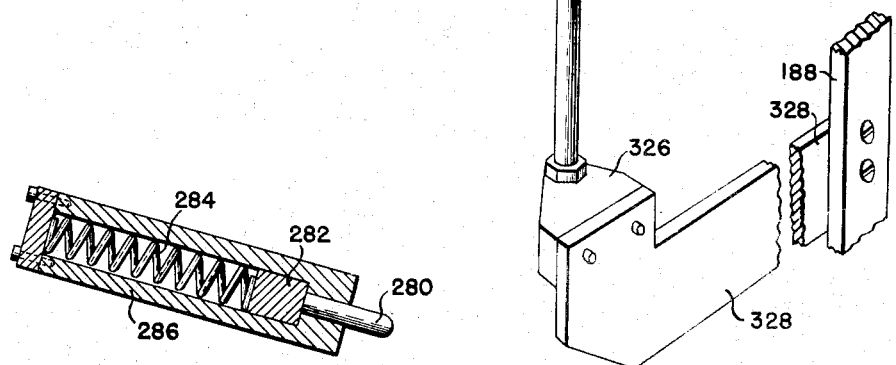
Figure 10 is a vertical section of the stop plunger which controls the position of the actuating arm on the return of the carriage.

A plunger 280 (shown in detail in Figure 10) is secured to a block 282 and biased downwardly by a spring 284 in casing 286. Plunger 280 is adapted to engage the rear surface of actuating arm 266.

A coil spring 288 (see Figure 5) secured to transverse shaft 264 acts to rotate shaft 264 and carry printing arm 260 rearwardly against plunger 280. It should be noted that the spring 288 is not strong enough to overcome the spring 284 biasing plunger 280.

Figure 3:
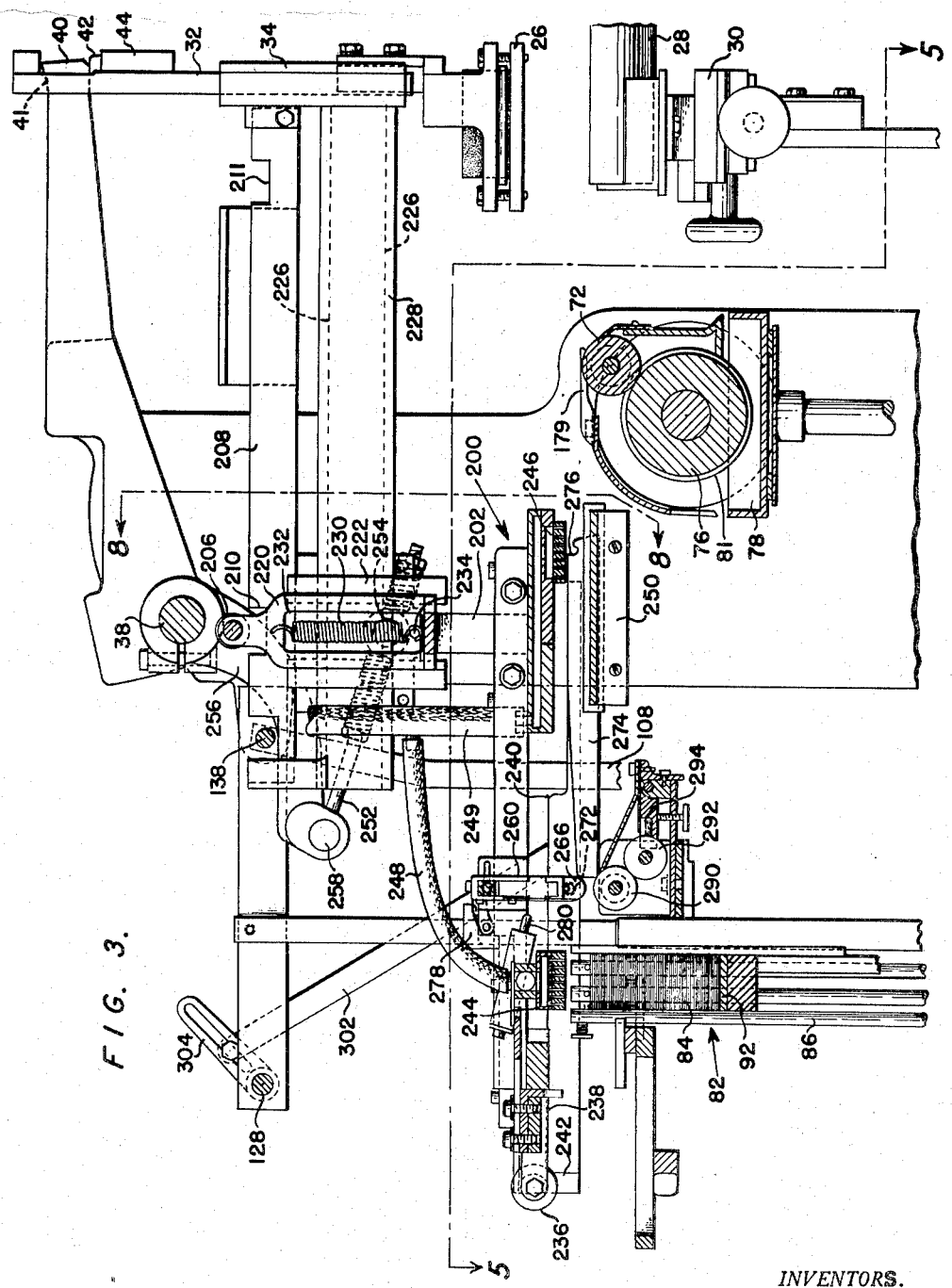
Figure 3 is a vertical section taken on a plane passing through the label suction heads of the machine of Figure 1 and showing the carriage in its rearward position.

Directly below printing arm 260, when the carriage is in the rearmost position, is located a rubber ink supply roller 290 which is driven by a metal roller 292 which abuts against an ink supply well 294 (see Figure 3).

Roller 292 is driven by shaft 296 (see Figure 2) which is connected to a toothed wheel 298 which is engaged by pawl 300. Pawl 300 is connected to shaft 128 by lever 302 and link 304.

The labeling machine in accordance with this invention will be clarified by the following description of its operation emphasizing particularly the new features. Assuming now that label magazine 82 is supplied and that printing table 250 is provided with a label and assuming that the carriage is in the position shown in Figure 3, it will be noted that roller 206 is directly over cut-out portion 210 in rail 208. At this point movable rail 212 is dropped downwardly due to the cam 192 permitting roller 190 to be pulled upwardly by spring 174. The action of spring 230 also assists the downward movement of yoke 202 and hence the downward movement of carriage 200. It will be noted that rollers 236 are clear of track 238 and therefore are free to drop downwardly.

As carriage 200 drops downwardly, it will be noted that printing arm 260 moves downwardly and code number 261 comes into contact with ink supply roller 290.

At this time cam 180 acts on roller 178 to force member 172 upwardly against bell crank 166 and forces valve 158 closed and provides for suction in lines 248 and 249 leading to suction heads 244 and 246 respectively.

When carriage 200 reaches its lowest position, head 244 picks up a label from magazine 82 and head 246 picks up a label resting on printing base 250. Cam 192 acting on roller 190 and its associated mechanism causes rail 212 to move upwardly, thus lifting roller 204, yoke 202 and carriage 200 upwardly. At this point, shaft 38 is rocked by gear segment 144 and its associated mechanism to move the carriage forward. Cam 192 now permits roller 190 to rise sufficiently so that yoke 202 is carried only by roller 206 and rail 208. This places head 246 at the proper level for the gluing of the label.

As the carriage moves forward, pin 272 comes in contact with cam track 274 which forces arm 266 to the rear depressing plunger 280 and causing the rotation of shaft 264 and the consequent rotation of printing arm 260 out of the vertical plane.

As head 246 passes over blades 82 and roller 72 an adhesive coating is applied to the label.

Again, as carriage 200 moves forwardly and clear of magazine 82, label feeler 120 is forced downwardly as cam 130 permits spring 135 together with its associated mechanisms to rotate shafts 128 and 138. As we have seen before if feeler 120 is permitted to drop low enough by the position of the stack of labels, it will cause the release of pawl 102 and the consequent raising of platform 92. Again, as we have previously seen, rotation of shaft 128 provides for the indexing of ink roller 290 through link 304, lever 302, pawl 300 and toothed wheel 298.

Figure 4:
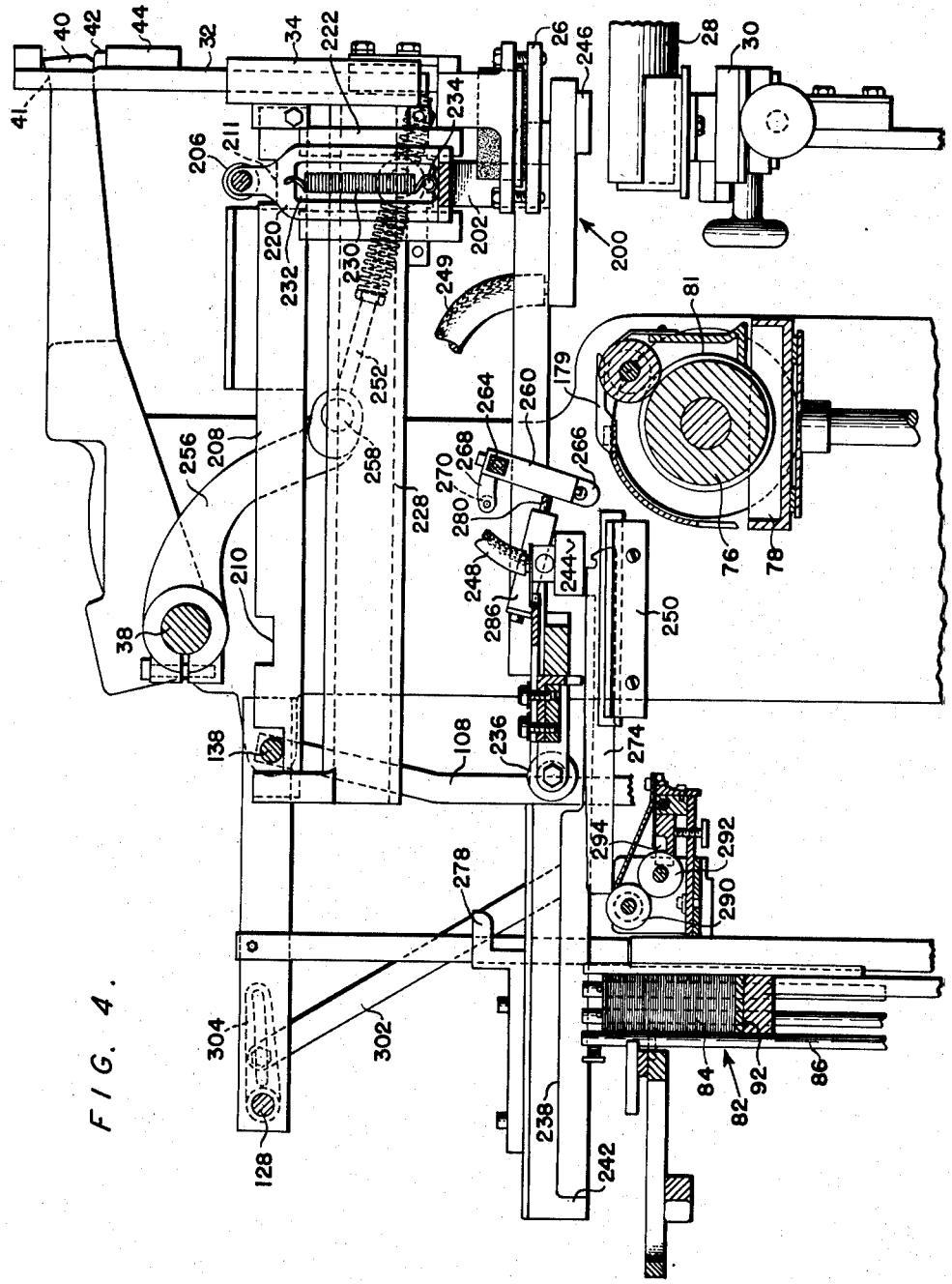
Figure 4 is a vertical section taken through the label suction heads of the machine of Figure 1 showing the carriage in its forward position.

The carriage proceeds forwardly until head 244 is over the proper deposit position of printing table 250 and head 246 is over the point of the bottle 28 on which it is desired to place the label. At this point, roller 206 registers with opening 211 in rail 208 and movable rail 212 is lowered by the operation of roller 190 and cam 192 and their associated mechanisms. The position of the carriage and its associated elements just before dropping in the forward position is shown in Figure 4.

After the carriage drops, cam 180 and roller 178, together with their associated mechanisms including bell crank 166, act to open valve 158, thus releasing the suction in heads 244 and 246. Consequently, head 244 releases the label onto printing table 250 and head 246 releases a label onto bottle 28. Pins 253 associated with printing table 250 insure that the label will not adhere to head 244 as it moves upwardly.

Cam 192 and roller 190 together with their associated mechanisms now act to raise rail 212, roller 204, roller 206, yoke 202 and carriage 200. Rail 212 is raised to a level slightly above that of rail 208 so that yoke 202 will be carried wholly by roller 204 in order that the carriage as it moves to the rear will be high enough so that head 246 does not come into contact with the mechanism for applying the adhesive.

As the carriage is moved rearwardly and clear of pressure member 26, pressure member 26 is moved downwardly by the action of lever 36 on plunger 32, incident to the downward movement of member 48. Pressure member 26 is brought into contact with the label and applies pressure thereto to insure its firm adherence to the bottle. Pressure member 26 is raised upwardly well in advance of the return of the carriage 200 to the forward position.

Figure 7A:
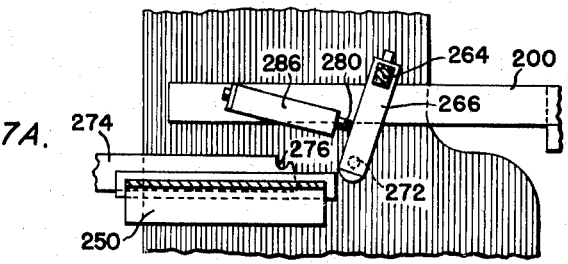
Figure 7a is a fragmentary showing of the actuating arm of the printing mechanism just before it reaches the printing position.
Figure 7B:
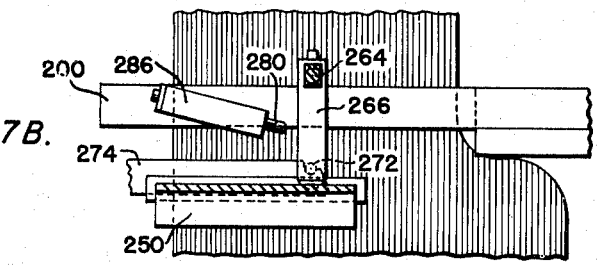
Figure 7b is a fragmentary showing of the actuating arm of the printing mechanism in the printing position.
Figure 7C:
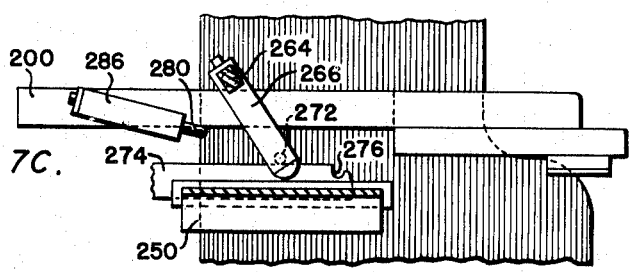
Figure 7c is a fragmentary showing of the actuating arm of the printing mechanism just after it has passed the printing position.

As the carriage proceeds rearwardly, actuating arm 266 is biased against plunger 280 by spring 288, it being noted that spring 288 is not strong enough to cause the rearward movement of plunger 280. As shown particularly in Figures 7a, 7b and 7c, the arm 266 is thus positioned to cause pin 272 to engage shoulder 276 in cam track 274. This causes the rotation of arm 266 in a clockwise direction, as viewed in Figures 7a, 7b and 7c, which in turn causes the rotation of printing arm 260 in a clockwise direction and forces the code numbers at 261 downwardly into contact with the label resting on printing table 250. Plunger 263 permits some play at this point. As the carriage continues to move rearwardly, arm 266 is rotated further by the action of shoulder 276 in conjunction with pin 272 until it is clear of the label thus printed and pin 272 is riding on cam track 274 against which it is held by spring 288.

When pin 272 drops off cam track 274, spring 288 rotates shaft 264 until printing arm 260 is vertical and stop member 278 engages roller 270 on stop arm 268.

As set forth in Patent 2,227,816, if either heads 244 or 246 fail to pick up a label, spring 182 will open valve 158 causing the interlocking of members 184 and 186 which will prevent the movable rail 212 from lowering to permit the head 246 to come into contact with adhesive applying means, thus preventing the placing of an adhesive coating on head 246 in the event of failure to pick up a label.

Figure 11:
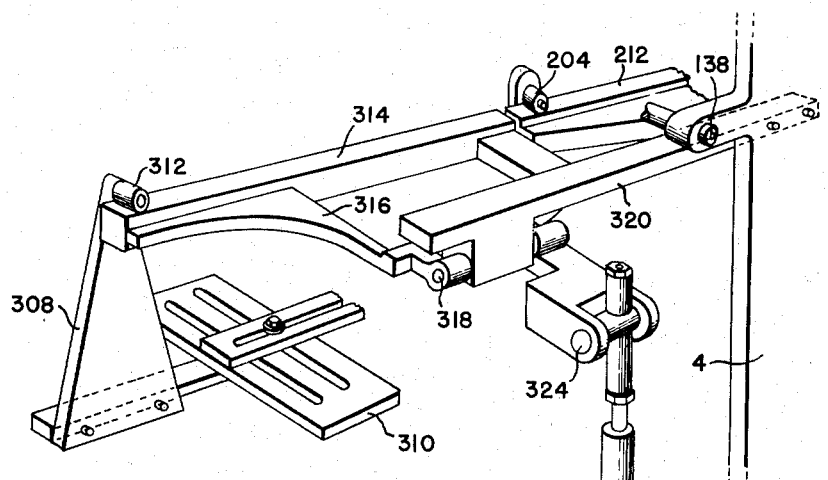
Figure 11 is a rear perspective view of a modified support structure for the carriage.

As shown in Figure 11, additional support for carriage 200 may be provided if desired where, for example, a heavy carriage is used. The additional support as shown has a bracket 308 which is secured to carriage cross-web member 310 which is also clearly shown in Figure 1. Bracket 308 has a roller 312 secured at its upper end. Roller 312 is adapted to ride on a movable rail 314 which moves in parallelism with movable rail 212.

Rail 314 is secured to an arm 316 which is pivotally secured at 318 to a bracket 320 mounted on frame 4. Arm 314 is also pivotally secured to a rod 322 at 324. Rod 322 is fixedly secured to the lower portion 188 of member 190 by means of a bracket 326 and plate 328.

It will be readily apparent from the above structure that rail 314 follows the movement of rail 212 and parallels for the rear part of carriage 200, the support given to the carriage by roller 204 and rail 212.

It will be understood that the labeling machine described in detail above is merely by way of illustration. Applicant, therefore, does not desire to be limited except as set forth in the following claims.

What is claimed is:

1. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support and printing means secured to said carriage and adapted to print the outside face of a label on the printing table on the return movement of the carriage.

2. In a labeling machine for printing labels and adhesively applying them to articles comprising a support for an article to be labeled, a magazine for a supply of labels remote from said support, a printing table between said support and said label magazine, said printing table having pins adapted to hold a label when released on the table, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support and printing means secured to said carriage and adapted to print the outside face of a label on the printing table on the return movement of the carriage.

3. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means including a vertically reciprocable suction head secured to said carriage for removing a label from said label holder and releasing said label into the printing table, means including a vertically reciprocable suction head secured to said carriage for removing a label from the printing table and releasing said label onto the article to be labeled, adhesive applying means between said printing table and said support and printing means secured to said carriage and adapted to print the outside face of a label on the printing table on the return movement of the carriage.

4. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support, printing means secured to said carriage and adapted to print the outside face of a label on the printing table on the return movement of the carriage, said printing means comprising a downwardly extending printing arm mounted on said carriage for rotation in a vertical plane and means to rotate said arm to bring the arm in contact with a label on the printing table on the return movement of the carriage.

5. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support, printing means secured to said carriage and adapted to print the outside face of a label on the printing table on the return movement of the carriage, said printing means comprising a downwardly extending printing arm mounted on said carriage for rotation in a vertical plane, means to rotate said arm to bring the arm in contact with a label on the printing table on the return movement of the carriage and means to periodically supply ink to said printing arm.

6. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support, printing means secured to said carriage and adapted to print the outside face of a label on the printing table on the return movement of the carriage, said printing means comprising a downwardly extending printing arm pivotally mounted on the carriage for rotation in a vertical plane, means to rotate said printing arm rearwardly as the carriage moves forward and means to rotate the printing arm forwardly on the return movement of the carriage to bring the printing arm in contact with a label on the printing table.

7. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support, printing means secured to said carriage and adapted to print the outside face of a label on the printing table on the return movement of the carriage, said printing means comprising a downwardly extending printing arm pivotally mounted on the carriage for rotation in a vertical plane, means to rotate said printing arm rearwardly as the carriage moves forward, means to rotate the printing arm forwardly on the return movement of the carriage to bring the printing arm in contact with a label on the printing table, and means to periodically supply ink to said printing arm.

8. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support, printing means secured to said carriage and adapted to print the outside face of a label on the printing table on the return movement of the carriage, said printing means comprising a transverse shaft secured to the carriage, a downwardly extending arm secured to rotate with said shaft, an actuating arm fixedly secured to said shaft, and cam means to rotate the actuating arm forwardly to cause the printing arm to contact a label on the printing table and move upwardly away from the printing table on the return movement of the carriage.

9. The labeling machine of claim 8 in which the cam means comprises a pin secured to the actuating arm and a cam adapted to coact with said pin.

10. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support, printing means secured to said carriage and adapted to print the outside face of a label on the printing table on the return movement of the carriage, said printing means comprising a transverse shaft secured to the carriage, a downwardly extending arm secured to rotate with said shaft, an actuating arm fixedly secured to said shaft, a pin secured to said actuating arm, a cam member adapted to engage said pin as the carriage moves rearwardly to rotate the actuating arm to cause the printing arm to contact a label on the printing table and move upwardly away from the printing table and means to maintain said pin at the proper level to engage said cam as the carriage moves rearwardly.

11. The labeling machine of claim 10 in which said pin leveling means comprises spring means biasing the actuating arm rearwardly against a spring biased plunger, the spring of the plunger being stronger than the biasing spring.

12. The labeling machine of claim 10 in which the transverse shaft has a rectangular portion which passes through a rectangular opening in the upper portion of the printing arm, a spring biased plunger being interposed between the lower face of the shaft and the actuating arm.

13. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support, printing means secured to said carriage and adapted to print the outside face of a label on the printing table on the return movement of the carriage, said printing means comprising a transverse shaft secured to the carriage, a downwardly extending printing arm secured to rotate with said shaft, a spring secured to said shaft to bias the printing arm rearwardly, inking means located below said printing arm when the carriage is in its rearmost position, means to bring said printing arm into contact with said inking means, an actuating arm fixedly secured to said shaft, a pin on said actuating arm, a cam member adapted to engage said pin as the carriage moves rearwardly to rotate the actuating arm to cause the printing arm to contact a label on the printing table and move upwardly away from the printing table and a forwardly biased plunger coacting with said spring to maintain the actuating arm in position so that the pin will be engaged by said cam member.

14. The labeling machine of claim 13 in which the means to bring the printing arm into contact with the inking means includes a stop arm secured to the transverse shaft and a fixed stop coacting with said arm to place the printing arm in a substantially vertical position.

15. In a labeling machine for printing labels and adhesively applying them to articles comprising a support for an article to be labeled, a magazine for a supply of labels remote from said support, a printing table between said support and said label magazine, a carriage, means to reciprocate said carriage in a horizontal path, means secured to said carriage for removing a label from said label holder and releasing said label onto the printing table, means secured to said carriage for removing a label from the printing table and releasing said label onto the article to be labeled, adhesive applying means between said printing table and said support, printing means secured to said carriage and adapted to print the outside face of a label on the printing table on the return movement of the carriage, said printing means comprising a transverse shaft secured to the carriage, a downwardly extending printing arm secured to rotate with said shaft, a spring secured to said shaft to bias the printing arm rearwardly, an inking roller located below said printing arm when the carriage is in its rearmost position, means to supply ink to said inking roller, means to index said inking roller during the reciprocation of said carriage, means to bring said printing arm into contact with said inking roller when the inking roller is in an arrested state, an actuating arm fixedly secured to said shaft, a pin on said actuating arm, a cam member adapted to engage said pin as the carriage moves rearwardly to rotate the actuating arm to cause the printing arm to contact a label on the printing table and move upwardly away from the printing table and a forwardly biased plunger coacting with said spring to maintain the actuating arm in position so that the pin will be engaged by said cam member.

CLAUDE C. HALL.
ROBERT W. HOMPE.
JACK A. MARTELL.

REFERENCES CITED

The following references are of record in the file of this patent:

UNITED STATES PATENTS

| Number | Name | Date |
|---|---|---|
| 1,440,856 | Westcott | Jan. 2, 1923 |
| 2,235,054 | Von Hofe | Mar. 18, 1941 |
| 2,338,887 | Von Hofe | Jan. 11, 1944 |
| 2,472,441 | Schmitt | June 7, 1949 |